United States Patent
Melakari et al.

(10) Patent No.: US 12,458,531 B2
(45) Date of Patent: Nov. 4, 2025

(54) ACTIVELY ADAPTIVE OPTICAL APPARATUSES FOR AMBLYOPIA TREATMENT

(71) Applicant: Pixieray Oy, Espoo (FI)

(72) Inventors: Klaus Melakari, Espoo (FI); Rebecca Qing Melakari, Espoo (FI)

(73) Assignee: Pixieray Oy, Espoo (FI)

( * ) Notice: Subject to any disclaimer, the term of this patent is extended or adjusted under 35 U.S.C. 154(b) by 439 days.

(21) Appl. No.: 18/189,711

(22) Filed: Mar. 24, 2023

(65) Prior Publication Data

US 2024/0315870 A1 Sep. 26, 2024

(51) Int. Cl.
| | |
|---|---|
| *A61F 9/00* | (2006.01) |
| *A61B 3/113* | (2006.01) |
| *G02B 27/00* | (2006.01) |
| *G02C 11/00* | (2006.01) |

(52) U.S. Cl.
CPC ............ *A61F 9/0008* (2013.01); *A61B 3/113* (2013.01); *G02B 27/0025* (2013.01); *G02C 11/10* (2013.01)

(58) Field of Classification Search
CPC ... A61F 9/0008; A61B 3/113; G02B 27/0025; G02B 27/0172; G02B 2027/0178; G02C 11/10; G02C 2202/20; G02C 7/083; G02C 7/086

USPC .......................................................... 351/202
See application file for complete search history.

(56) References Cited

U.S. PATENT DOCUMENTS

| | | | | |
|---|---|---|---|---|
| 11,064,882 | B2 * | 7/2021 | Oz ........................... | A61H 5/00 |
| 2017/0365101 | A1 * | 12/2017 | Samec ................... | G16H 20/70 |
| 2020/0329961 | A1 * | 10/2020 | Oz ........................... | A61B 3/08 |
| 2021/0398357 | A1 * | 12/2021 | Samec ................. | A61B 5/4094 |
| 2023/0343045 | A1 * | 10/2023 | Samec ................... | A61B 5/746 |

* cited by examiner

Primary Examiner — William R Alexander
(74) Attorney, Agent, or Firm — ZIEGLER IP LAW GROUP, LLC.

(57) ABSTRACT

An optical apparatus includes eye-tracking means; a dominant-eye optical element for dominant eye, a non-dominant-eye optical element for non-dominant eye of a user and processor. Each optical element includes a first substrate and a second substrate, and active material encased between the substrates, controlling means for controlling active material to generate optical power(s). The processor is configured to determine gaze directions of both eyes; detect when given criteria is satisfied, such satisfaction being when gaze directions have not converged for predefined time period(s) and/or within predefined error margin; and upon such satisfaction, activate amblyopia treatment mode and generate drive signals for controlling means of both optical elements to perform: (i) produce different optical power for dominant eye and predefined optical power for non-dominant eye, or (ii) produce predefined optical powers for both eyes whilst applying prism correction.

18 Claims, 3 Drawing Sheets

ACTIVELY ADAPTIVE OPTICAL APPARATUSES FOR AMBLYOPIA TREATMENT

TECHNICAL FIELD

The present disclosure relates to optical apparatuses incorporating actively adaptive optical elements for amblyopia treatment. The present disclosure also relates to methods incorporating actively adaptive optical elements for amblyopia treatment.

BACKGROUND

Amblyopia, commonly known as lazy eye syndrome, is a vision disorder in which there is a reduced vision in an eye of a human. The reduced vision occurs when visual capabilities of the eye (namely, a weaker eye) are not developed properly during childhood, due to abnormal visual experience. The abnormal visual experience can happen when there is interference during focusing using both the eyes, during early childhood. This can occur due to one or more of a strabismic error because of poor alignment of the eyes, difficulty in focusing because of an irregular shape of the weaker eye, a refractive error because of different optical powers of the weaker eye and a stronger/dominant eye (such as, for example when the weaker eye is more near-sighted or more far-sighted than the stronger eye), a deprivational error because of clouding of lens of the weaker eye, or similar. Moreover, in some people, there may be underdevelopment of eye muscles corresponding to the weaker eye. The underdevelopment of the eye muscles of the weaker eye takes place as the brain increasingly favours the stronger eye of the human to process the visual input, which gradually decreases the vision in the weaker eye. Subsequently, the brain of the human fails to fully process a visual input as seen by the weaker eye. Amblyopia is a common cause of decreased vision in a single eye (or, both eyes) among children and younger adults.

Typically, the vision of the weaker eye is not restored right away when an underlying cause of the abnormal visual experience is addressed, as the brain needs to be trained as well to favour both the eyes equally. In this regard, prescription eyeglasses are used to correct refractive errors of the eyes of the human, but the prescription eyeglasses are not able to treat the brain's ability to process the visual input as seen from the weaker eye.

Traditionally, occlusion therapy is used to improve the vision in the weaker eye, by using an eye patch to cover the stronger eye for a predefined time period in a day. However, this typically causes discomfort to the human, as visual input is received only from the weaker eye. Furthermore, a cosmetic impact of using the eye-patch may cause social isolation or discrimination during childhood, which in turn reduces a motivation to continue with the treatment. Alternatively, eye drops are used to temporarily blur the vision of the stronger eye, so that the brain receives visual input from only the weaker eye. However, using such eye drops leads to irritation in the stronger eye, and also makes the stronger eye sensitive to light. Conventional treatments of treating the weaker eye suffering from amblyopia require considerable human involvement, and can reduce capability for the human to function normally due to lack of stereo vision.

Therefore, in light of the foregoing discussion, there exists a need to overcome the aforementioned drawbacks associated with existing treatments for amblyopia.

SUMMARY

The present disclosure seeks to provide an optical apparatus incorporating actively adaptive optical elements for amblyopia treatment. The present disclosure also seeks to provide a method incorporating actively adaptive optical elements for amblyopia treatment. An aim of the present disclosure is to provide a solution that overcomes at least partially the problems encountered in prior art.

In a first aspect, an embodiment of the present disclosure provides an optical apparatus comprising:
  eye-tracking means;
  a dominant-eye optical element and a non-dominant-eye optical element for a dominant eye and a non-dominant eye of a user, respectively, wherein each of the dominant-eye optical element and the non-dominant-eye optical element comprises:
    at least a first substrate and a second substrate that are optically transparent;
    an active material encased between the first substrate and the second substrate; and
    controlling means for controlling the active material to generate one or more optical powers; and
  a processor configured to:
    process eye-tracking data, collected by the eye-tracking means, to determine a gaze direction of the dominant eye and a gaze direction of the non-dominant eye;
    detect when a given criteria is satisfied, wherein the given criteria is satisfied when at least one of the following is true:
      the gaze direction of the dominant eye and the gaze direction of the non-dominant eye has not converged for at least a predefined time period,
      the gaze direction of the dominant eye and the gaze direction of the non-dominant eye has not converged within a predefined error margin from each other; and
    when it is detected that the given criteria is satisfied, activate an amblyopia treatment mode of the optical apparatus, and generate respective drive signals to drive the controlling means of the dominant-eye optical element and the controlling means of the non-dominant-eye optical element to perform any of:
      (i) produce, at the dominant-eye optical element, an optical power that is different from a predefined dominant-eye optical power corresponding to the dominant eye, whilst producing, at the non-dominant-eye optical element, a predefined non-dominant-eye optical power corresponding to the non-dominant eye,
      (ii) produce the predefined dominant-eye optical power and the predefined non-dominant eye optical power at the dominant-eye optical element and the non-dominant-eye optical element, respectively, whilst applying a prism correction on the dominant-eye optical element to optically shift light, incident thereupon and emanating from a region of a real-world environment at which the non-dominant eye is gazing, to be incident on a fovea of the dominant eye.

In a second aspect, an embodiment of the present disclosure provides a method implemented by an optical apparatus comprising eye-tracking means, a processor, and a dominant-eye optical element and a non-dominant-eye optical element for a dominant eye and a non-dominant eye of a user, respectively, wherein each of the dominant-eye optical element and the non-dominant-eye optical element comprises at least a first substrate and a second substrate that are optically transparent, an active material encased between the first substrate and the second substrate, and controlling means for controlling the active material to generate one or more optical powers, wherein the method comprises:

processing eye-tracking data, collected by the eye-tracking means, for determining a gaze direction of the dominant eye and a gaze direction of the non-dominant eye of the user;

detecting when a given criteria is satisfied, wherein the given criteria is satisfied when at least one of the following is true:

the gaze direction of the dominant eye and the gaze direction of the non-dominant eye has not converged for at least a predefined time period,         the gaze direction of the dominant eye and the gaze direction of the non-dominant eye has not converged within a predefined error margin from each other; and     when it is detected that the given criteria is satisfied, activating an amblyopia treatment mode of the optical apparatus, and generating respective drive signals to drive the controlling means of the dominant-eye optical element and the controlling means of the non-dominant-eye optical element for performing any of:

(i) producing, at the dominant-eye optical element, an optical power that is different from a predefined dominant-eye optical power corresponding to the dominant eye, whilst producing, at the non-dominant-eye optical element, a predefined non-dominant-eye optical power corresponding to the non-dominant eye,     (ii) producing the predefined dominant-eye optical power and the predefined non-dominant eye optical power at the dominant-eye optical element and the non-dominant-eye optical element, respectively, whilst applying a prism correction on the dominant-eye optical element to optically shift light, incident thereupon and emanating from a region of a real-world environment at which the non-dominant eye is gazing, to be incident on a fovea of the dominant eye.

Embodiments of the present disclosure substantially eliminate or at least partially address the aforementioned problems in the prior art, and facilitate a user-friendly, simple, and effective amblyopia treatment, using an actively adaptive optical apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an optical apparatus comprising:

eye-tracking means;

a dominant-eye optical element and a non-dominant-eye optical element for a dominant eye and a non-dominant eye of a user, respectively, wherein each of the dominant-eye optical element and the non-dominant-eye optical element comprises:

at least a first substrate and a second substrate that are optically transparent;

an active material encased between the first substrate and the second substrate; and         controlling means for controlling the active material to generate one or more optical powers; and     a processor configured to:

process eye-tracking data, collected by the eye-tracking means, to determine a gaze direction of the dominant eye and a gaze direction of the non-dominant eye;

detect when a given criteria is satisfied, wherein the given criteria is satisfied when at least one of the following is true:

the gaze direction of the dominant eye and the gaze direction of the non-dominant eye has not converged for at least a predefined time period,             the gaze direction of the dominant eye and the gaze direction of the non-dominant eye has not converged within a predefined error margin from each other; and         when it is detected that the given criteria is satisfied, activate an amblyopia treatment mode of the optical apparatus, and generate respective drive signals to drive the controlling means of the dominant-eye optical element and the controlling means of the non-dominant-eye optical element to perform any of:

(i) produce, at the dominant-eye optical element, an optical power that is different from a predefined dominant-eye optical power corresponding to the dominant eye, whilst producing, at the non-dominant-eye optical element, a predefined non-dominant-eye optical power corresponding to the non-dominant eye, (ii) produce the predefined dominant-eye optical power and the predefined non-dominant eye optical power at the dominant-eye optical element and the non-dominant-eye optical element, respectively, whilst applying a prism correction on the dominant-eye optical element to optically shift light, incident thereupon and emanating from a region of a real-world environment at which the non-dominant eye is gazing, to be incident on a fovea of the dominant eye.

In a second aspect, an embodiment of the present disclosure provides a method implemented by an optical apparatus comprising eye-tracking means, a processor, and a dominant-eye optical element and a non-dominant-eye optical element for a dominant eye and a non-dominant eye of a user, respectively, wherein each of the dominant-eye optical element and the non-dominant-eye optical element comprises at least a first substrate and a second substrate that are optically transparent, an active material encased between the first substrate and the second substrate, and controlling means for controlling the active material to generate one or more optical powers, wherein the method comprises:

processing eye-tracking data, collected by the eye-tracking means, for determining a gaze direction of the dominant eye and a gaze direction of the non-dominant eye of the user;

detecting when a given criteria is satisfied, wherein the given criteria is satisfied when at least one of the following is true:

the gaze direction of the dominant eye and the gaze direction of the non-dominant eye has not converged for at least a predefined time period, the gaze direction of the dominant eye and the gaze direction of the non-dominant eye has not converged within a predefined error margin from each other; and when it is detected that the given criteria is satisfied, activating an amblyopia treatment mode of the optical apparatus, and generating respective drive signals to drive the controlling means of the dominant-eye optical element and the controlling means of the non-dominant-eye optical element for performing any of:

(i) producing, at the dominant-eye optical element, an optical power that is different from a predefined dominant-eye optical power corresponding to the dominant eye, whilst producing, at the non-dominant-eye optical element, a predefined non-dominant-eye optical power corresponding to the non-dominant eye, (ii) producing the predefined dominant-eye optical power and the predefined non-dominant eye optical power at the dominant-eye optical element and the non-dominant-eye optical element, respectively, whilst applying a prism correction on the dominant-eye optical element to optically shift light, incident thereupon and emanating from a region of a real-world environment at which the non-dominant eye is gazing, to be incident on a fovea of the dominant eye.

The present disclosure provides the aforementioned optical apparatus and the aforementioned method. Pursuant to embodiments of the present disclosure, the optical apparatus is configured to actively check for presence of an amblyopia condition, and if amblyopia is found to be present, dynamically produce different optical powers for different eyes of the user by generating the respective drive signals to drive the controlling means of the dominant-eye optical element and the controlling means of the non-dominant-eye optical element according to any of the aforementioned treatment solutions: (i) or (ii). The different optical powers can be selectively and dynamically produced for both the eyes, such that amblyopia is effectively treated by using the optical apparatus. Advantageously, amblyopia in the non-dominant eye is treated by improving a base vision of the non-dominant eye, instead of occluding a vision of the dominant eye completely. This facilitates correction of vision of the non-dominant eye of the user, while maintaining a high visual acuity when the user views the real-world environment. Hence, the brain of the user is simultaneously trained to gradually receive visual inputs from both the eyes of the user, and to favour the visual inputs from both the eyes equally. In this way, the optical apparatus and the method facilitate a user-friendly, simple and effective amblyopia treatment.

Moreover, the dominant-eye optical element and the non-dominant eye optical element are optically efficient and dynamically controllable, while having low power requirements. The dominant-eye optical element and the non-dominant-eye optical element can easily be implemented in various types of optical apparatuses, for example, such as a pair of glasses, a pair of sunglasses, smart glasses, a head-mounted display, or similar. Moreover, the method can be implemented with ease.

Throughout the present disclosure, the term "optical apparatus" refers to an apparatus that is to be worn over the eyes of the user. Examples of such an optical apparatus include, but are not limited to, a pair of glasses, a pair of sunglasses, smart glasses, and a head-mounted display.

Throughout the present disclosure, the term "eye-tracking means" refers to a specialized equipment that is employed to detect and/or follow a direction of gaze of the user of the optical apparatus. Such eye-tracking is performed when the optical apparatus, in operation, is worn by the user. Optionally, the eye-tracking means is implemented by way of at least one of: contact lenses having sensors, cameras monitoring features of the user's eyes. Such features may comprise at least one of: a shape of a pupil of the user's eye, a size of the pupil, corneal reflections of light emanating from a real-world environment from a surface of the user's eye, a relative position of the pupil with respect to the corneal reflections, a relative position of the pupil with respect to corners of the user's eye. Such eye-tracking means are well-known in the art. The eye-tracking means is configured to collect the eye-tracking data and send the eye-tracking data to the processor. It will be appreciated that the eye-tracking data is collected repeatedly by the eye-tracking means throughout an operation of the optical apparatus, as gaze of the user's eyes keeps changing whilst she/he uses the optical apparatus. An up-to-date eye-tracking data (indicative of the gaze directions of the dominant eye and the non-dominant eye of the user) allows for adaptively controlling active optical elements of the optical apparatus in an accurate manner, for effective amblyopia treatment. In an instance, when the eye-tracking means is implemented as the camera, the eye-tracking data is in form of images of the user's eyes. In another instance, when the eye-tracking means is implemented by way of contact lenses having sensors, the eye-tracking data is the sensor data collected from the sensors.

An eye of the user whose visual input is more preferred by the brain compared to that of another eye of the user is referred to as a "dominant eye" of the user, and the another eye of the user whose visual input is less preferred by the brain is referred to as a "non-dominant eye". In some cases, an ocular dominance of the user (i.e., tendency of the user's eyes to prefer visual input from one eye to visual input from another eye of the user) may be a normal visual condition of proper functioning of the user's eyes, wherein both eyes of the user have similar visual acuity and one eye is simply preferred over the other eye. In other cases, the ocular dominance of the user may be indicative of an underlying medical condition from which the user suffers. Such a medical condition may be, for example, amblyopia, constant strabismus, intermittent strabismus, or the like. Herein, the dominant eye can be any one of a left eye or a right eye of the user, and correspondingly, the non-dominant eye can be another one of the right eye or the left eye of the user.

In some implementations, information indicative of the dominant eye and the non-dominant eye of the user is pre-determined and is pre-stored for the user, at a data repository that is communicably coupled to the processor. In such a case, the processor is configured to obtain the information indicative of the dominant eye and the non-dominant eye from the data repository. Such a data repository may be implemented as a memory of the optical apparatus, a memory of a computing device communicably coupled to the optical apparatus, a removable memory, a cloud-based memory, or similar. Optionally, the information indicative of the dominant eye and the non-dominant eye is pre-determined by an ophthalmologist. In such a case, the ophthalmologist conducts at least one eye test for the user's eyes to determine which eye of the use is the dominant eye. Optionally, the information indicative of the dominant eye and the non-dominant eye is communicated from a computing device associated with the ophthalmologist or the user, to the data repository, wherein the computing device associated with the ophthalmologist or the user is communicably coupled to the data repository. Examples of such a computing device include, but are not limited to, a computer, a laptop, a smartphone, and a tablet. It will be appreciated that the data repository is optionally used to store information indicative of the dominant eye and the non-dominant eye for a plurality of users. The processor could also obtain the information pertaining to the dominant eye and the non-dominant eye directly from the user, prior to, or at a start of a given session of operating the optical apparatus.

In other implementations, the processor is configured to determine the dominant eye during an initial calibration of the optical apparatus according to the user's eyes. In such a case, the eye-tracking means of the optical apparatus is employed to generate gaze-tracking data for the user's eyes during the initial calibration of the optical apparatus. Optionally, in this regard, the eye-tracking means is employed to collect the gaze-tracking data of both eyes of the user, whilst at least one reference image is displayed to the user (for example, using at least one display of the optical apparatus or an external display device) during the initial calibration. Herein, the term "reference image" refers to an image that is to be used for calibrating the optical apparatus according to the user's eyes. Optionally, in this regard, the at least one reference image presents to the user a given visual target at a given location and a given optical depth. The term "visual target" refers to a visible mark (namely, spot) represented within the at least one reference image. Notably, the given visual target is distinctly visible in the at least one reference image. Optionally, in the at least one reference image, the given visual target may be represented at a central portion, a corner portion, a top portion, a right side portion, or the like, of a field of view of the user. In this regard, the processor is configured to determine expected gaze directions of the user's eyes, based on the given location and the given optical depth of the given visual target; and compare the expected gaze directions of the user's eyes with determined gaze directions of the user's eyes, to determine which eye of the user acts as the dominant eye (at the given optical depth). In this regard, an eye of the user for which the expected gaze direction is substantially similar to the determined gaze direction is determined to be the dominant eye.

Throughout the present disclosure, the term "optical element" refers to an active optical element whose optical power can be changed. In other words, an optical power of a given optical element is (actively) adjustable. Herein, the given optical element encompasses the dominant-eye optical element and the non-dominant-eye optical element. In this regard, the given optical element is (optionally, electrically) controlled to produce different optical power(s). Notably, the dominant-eye optical element produces one or more optical powers for the dominant eye of the user, whereas the non-dominant-eye optical element produces one or more optical powers for the non-dominant eye of the user, depending on the optical depth at which the user is looking.

The optical transparency of the first substrate and the second substrate enable passage of light therethrough. The first substrate and the second substrate are arranged adjacent to each other in a manner that the active material is encased between the first substrate and the second substrate. For example, the first substrate and the second substrate may be arranged one on top of the other in an overlapping manner, thereby forming a cavity between the first substrate and the second substrate. Herein, the cavity is filled with the active material. Optionally, when only one of the first substrate and the second substrate has a curvature, a light ray incident on such a substrate converges or diverges according to the curvature. In such a case, another of the first substrate and the second substrate can be made significantly thin, so as to not falsely converge or diverge the light ray.

A refractive index of the first substrate can be same as or different from a refractive index of the second substrate. Moreover, the first substrate and/or the second substrate can be made of any one of: a glass, a polycarbonate, a plastic, a high-index plastic. Other examples of materials suitable for the first substrate and/or the second substrate are well within the scope of the present disclosure.

Throughout the present disclosure, the term "active material" refers to a material that is actively controllable to produce one or more optical powers at a given optical element. As an example, the active material can be a liquid crystal material. Throughout the present disclosure, the term "controlling means" refers to a drive circuit that, in operation, controls the active material to produce the one or more optical powers.

Optionally, the controlling means comprises:
at least one first electrode deposited on the first substrate and disposed between the first substrate and the active material; and
at least one second electrode deposited on the second substrate and disposed between the second substrate and the active material, wherein the at least one first electrode and the at least one second electrode are optically transparent, wherein the active material is a liquid crystal material, wherein when controlling the active material, an alignment of liquid crystal molecules of the liquid crystal material is controlled to adjust a refractive index of the liquid crystal material in the active optical element, thereby producing a given optical power.

Optionally, in this regard, the given optical power is produced (i.e., generated) by creating a relative refractive index between the active material and the substrates (i.e., the first substrate and the second substrate). Additionally, optionally, the given optical power produced at the given optical element depends on a curvature of a surface of at least one of: the first substrate, the second substrate.

Optionally, the at least one first electrode is deposited as a first transparent electrode layer on the first substrate. In such a case, the first transparent electrode layer covers an entirety of a surface of the first substrate, such that the first transparent electrode layer is properly disposed throughout, between said surface of the first substrate and the active material. Alternatively, optionally, the at least one first electrode comprises a plurality of first electrodes that are deposited as a non-continuous, first transparent electrode layer comprising separate, unconnected segments of said first transparent electrode layer on the first substrate.

Likewise, optionally, the at least one second electrode is deposited as a second transparent electrode layer on the second substrate. In such a case, the second transparent electrode layer covers an entirety of a surface of the second substrate, such that the second transparent electrode layer is disposed between said surface of the second substrate and the active material. Alternatively, optionally, the at least one second electrode comprises a plurality of second electrodes that are deposited as a non-continuous, second transparent electrode layer comprising separate, unconnected segments of said second transparent electrode layer on the second substrate. In such a case, the plurality of second electrodes could be aligned with respective ones of the plurality of first electrodes.

It will be appreciated that a given electrode layer may, for example, be made of indium tin oxide (ITO) or doped zinc oxide (ZnO), where ZnO is doped with aluminium or hydrogen. Alternatively, the given electrode layer may be made of a conductive polymer or of graphene.

In order to produce the given optical power, the active material in the given optical element is controlled by generating a potential difference between the at least one first electrode and the at least one second electrode using the controlling means. In some implementations, when a zero potential difference is generated (namely, by applying a same voltage to both the aforesaid electrodes or by connecting both the aforesaid electrodes to an electrical ground), the given optical element is in an 'OFF' mode in which the given optical element has a base optical power, which may be a negative optical power, a zero optical power, or a positive optical power, depending on user's requirement. In other implementations, the given optical element is in an 'ON' mode in which the given optical power is produced, when a given potential difference is generated between the at least one first electrode and the at least one second electrode depending on the given optical power that is to be produced. In this regard, the at least one first electrode and the at least one second electrode can be supplied with varying voltages to allow different amounts of the potential difference to be generated therebetween. As an example, the at least one first electrode could be driven at a given voltage that corresponds to the given optical power to be produced, while the at least one second electrode could be connected to an electrical ground.

It will be appreciated that the processor is communicably coupled to the eye-tracking means, the controlling means of the dominant-eye optical element, and the controlling means of the non-dominant-eye optical element. The processor could be implemented as any one of: a microprocessor, a microcontroller, or a controller. As an example, the processor could be implemented as an application-specific integrated circuit (AISC) chip or a reduced instruction set computer (RISC) chip.

Furthermore, optionally, the processor is configured to:
determine an optical depth at which the user is looking, based on a convergence of the gaze direction of the dominant eye and the gaze direction of the non-dominant eye; and
select a predefined optical power for a given eye, from amongst a plurality of predefined optical powers for the given eye, based on the optical depth at which the user is looking.

The "gaze direction" of a given eye refers to a direction in which the given eye of the user is gazing. The gaze direction may be represented by a gaze vector.

Optionally, the processor is configured to determine a distance (i.e., optical depth) of a given object (in the real-world environment at which the user is looking) from the user's eyes, when the gaze direction of the dominant eye and the gaze direction of the non-dominant eye converge at any portion of the given object. In this regard, the optical depth can be determined, based on an inter-pupillary distance of the user, by using triangulation.

Herein, the predefined optical power for a given eye of the user may be a negative optical power, a zero optical power, or a positive optical power, depending on the optical depth and the user's requirement (namely, whether the user has presbyopia or myopia). For distance viewing, the predefined optical power for the given eye of the user is a negative optical power (when the user has myopia), or the zero optical power (when the user does not have myopia). For reading or looking at nearby objects, the predefined optical power for the given eye is a positive optical power (when the user has hypermetropia or presbyopia), or the zero optical power (when the user does not have any of hypermetropia or presbyopia). Herein, the given eye encompasses the dominant eye and/or the non-dominant eye.

Furthermore, in this regard, the plurality of predefined optical powers are different optical powers (i.e., negative optical power, zero optical power, or positive optical power) corresponding to different optical depths. The predefined optical power is selected for the given eye from amongst the plurality of predefined optical powers (that may be prescribed for the user for the different optical depths), based on the optical depth at which the user is looking. The predefined optical power selected for the given eye of the user may be same as or different from the predefined optical power selected for another eye of the user.

The processor is configured to detect whether the given criteria is satisfied or not. Herein, the term "criteria" refers to a condition on which a decision and/or further processing steps may be based. In this regard, when the given criteria is satisfied, the non-dominant eye of the user is considered to suffer from amblyopia. In the given criteria, the phrase "at least one" means that the given criteria would be satisfied even when only one of the following conditions is true.

Condition 1:

It will be appreciated that in order to clearly see objects in the real-world environment with binocular vision, the gaze direction of the dominant eye and the gaze direction of the non-dominant eye need to converge at those objects. Furthermore, when light emanating from a point of gaze convergence falls on a fovea of the dominant eye and a fovea of the non-dominant eye at a same time, the user's eyes are able to perceive a high degree of visual detail of the point of gaze convergence. However, when light emanating from the point of gaze convergence falls on the fovea of the dominant eye, but does not fall on the fovea of the non-dominant eye, there is a mismatch between a foveal vision of the dominant eye with a foveal vision of the non-dominant eye. Hence, when the foveal vision of the dominant eye and the foveal vision of the non-dominant eye do not overlap for at least the predefined time period, it means that the brain is preferring the dominant eye (over the non-dominant eye) to see the objects in the real-world environment. Herein, the term "fovea" refers to a part of the retina, which is responsible for sharp and detailed vision. In this regard, approximately 1 degree up to 3 degrees of a field of view of the given eye is focused on the fovea of the given eye, wherein the term "foveal vision" refers to a part of a visual field that falls on the fovea.

It is possible that the gaze direction of the dominant eye and the non-dominant eye do not converge for a very small fraction of time, but converge majority of the time. Alternatively, it is also possible that the gaze direction of the non-dominant eye consistently misses to converge with the gaze direction of the non-dominant eye. This may happen when an existing underlying condition deteriorates a health of the non-dominant eye over time. Therefore, for both the possibilities, it is beneficial to check whether the gaze direction of the dominant eye and the gaze direction of the non-dominant eye have not been converging for at least the predefined time period. Herein, the predefined time period may be in milliseconds, seconds, and similar. The predefined time period may lie in a range from 100 milliseconds (ms) up to 5000 ms. The predefined time period may, for example, lie in a range from 100, 150, 250, or 500 ms up to 300, 500, 1000, 2000, 3000, 4000, or 5000 ms. The predefined time period may be selected specific to a given user. For example, the predefined time period may be 250 ms for a first user. In such a case, if the gaze direction of the dominant eye and the gaze direction of the non-dominant eye has not been converging for last 270 ms, the given criteria is considered to be satisfied. In another example, the predefined time period may be 2000 ms for a second user.

Condition 2:

It will be appreciated that the predefined error margin is an angular error margin, wherein the predefined error margin refers to a maximum error margin that is considered acceptable for binocular vision. Herein, examples of feasible units of the predefined error margin may include, but are not limited to, degree, radian, and arc minute. In one instance, the gaze direction of the dominant eye converges with the gaze direction of the non-dominant eye within the predefined error margin. In such a case, mutual coordination and operation of the user's eyes is considered to be acceptable. However, in another instance, when the gaze direction of the dominant eye and the gaze direction of the non-dominant eye do not converge within the predefined error margin, the user is considered to be suffering from amblyopia. This means that at a given optical depth, the gaze directions do not converge with sufficient accuracy and this adversely impacts how human brain perceives a binocular view of object(s) at the given optical depth. Herein, optionally, the predefined error margin lies in a range of 0.1 degrees to 3 degrees. The predefined error margin may, for example, lie in a range from 0.1, 0.2, 0.4, or 0.5 degrees up to 0.75, 1, 1.5, 2 or 3 degrees. For example, the gaze direction of the dominant eye and the gaze direction of the non-dominant eye may converge at 0.5 degrees from each other; in such a case, if the predefined error margin is 0.4 degrees, then the condition 2 of the given criteria is considered to be satisfied. It will be appreciated that other ranges of the predefined error margin are well within the scope of the present disclosure.

When it is detected that the given criteria is satisfied, it means that the user is considered to suffer from amblyopia. In order to treat the amblyopia, the amblyopia treatment mode of the optical apparatus is activated by generating a first drive signal to drive the controlling means of the dominant-eye optical element, and generating a second drive signal to drive the controlling means of the non-dominant-eye optical element. The respective drive signals are generated based on an optical power to be produced at the dominant-eye optical element and an optical power to be produced at the non-dominant-eye optical element. The drive signals can be a voltage signal or a current signal. In the amblyopia treatment mode, any of two following treatment solutions may be employed.

Solution (i):

In this solution, the first drive signal is generated to produce the optical power that is different from the predefined dominant-eye optical power, so that the visual acuity (i.e., vision quality) of the dominant eye is decreased. Simultaneously, the second drive signal is generated to produce the predefined non-dominant-eye optical power corresponding to the non-dominant eye, so that the visual acuity of the non-dominant eye is increased. Herein, the predefined dominant-eye optical power is an optical power (i.e., a negative optical power, a zero optical power, or a positive optical power) that is to be produced corresponding to the dominant eye, for enabling high visual acuity (i.e., perfect or near-perfect vision) of the dominant eye, whilst taking into consideration given properties of the dominant eye. Similarly, the predefined non-dominant-eye optical power is an optical power (i.e., a negative optical power, a zero optical power, or a positive optical power) that is to be produced corresponding to the non-dominant eye, for enabling high visual acuity (i.e., perfect or near-perfect vision) of the non-dominant eye, whilst taking into consideration given properties of the non-dominant eye. Herein, the given properties refer to existing underlying conditions of the user's eyes, for example, such as, myopia, hypermetropia, presbyopia, or similar. For example, when the user has presbyopia and is focusing at nearby objects, both the predefined dominant-eye optical power and the predefined non-dominant-eye optical power may be positive optical powers.

In the solution (i), the non-dominant eye's vision is corrected by using the predefined non-dominant-eye optical power, while leaving the dominant eye's vision uncorrected or lowering the dominant eye's vision by using the optical power that is different from the predefined dominant-eye optical power. Advantageously, this compels (in other words, trains) the brain of the user to prefer the vision from the non-dominant eye, thereby improving a base vision quality of the user's eyes. Consequently, over time, the brain will eventually start using both the dominant eye and the non-dominant eye with similar priority (i.e., without preferring any particular eye over the other). It will be appreciated that such training of the brain can be performed using vergence-accommodation reflex to aid the non-dominant eye to maintain clear focus on any given object, for example, based on the gaze direction of the non-dominant eye and/or the optical depth at which the user is looking.

In an example, zero optical power is the predefined dominant-eye optical power, when the dominant eye has a perfect vision. In such a case, the drive signal is generated to drive the controlling means of the dominant-eye optical element, to produce an optical power that is different from the zero optical power. This introduces a visual blur to the dominant eye. Advantageously, this compels (in other words, trains) the brain of the user to prefer the non-dominant eye, thereby improving the base vision of the user's eyes.

Solution (ii):

In the solution (ii), the respective drive signals are generated to drive the controlling means of the dominant-eye optical element and the controlling means of the non-dominant-eye optical element to produce the predefined dominant-eye optical power and the predefined non-dominant-eye optical power, respectively, so that perfect vision is achieved by the user's eyes based on the properties of the dominant eye and the properties of the non-dominant eye. However, prism correction is applied simultaneously on the dominant-eye optical element, to optically shift the light incident thereupon, for overall visual alignment of the user's eyes. The prism correction optically shifts the light, based on the gaze direction of the non-dominant eye, such that the light (emanating from the region of the real-world environment at which the non-dominant eye is gazing) is incident on the fovea of the dominant eye. A technical effect of optically shifting said light is to force the gaze directions of the dominant eye and the gaze directions of the non-dominant eye to converge, based on the gaze direction of the non-dominant eye. By such shifting of light for the dominant eye, what the user sees through the dominant eye is controlled according to the region at which the non-dominant eye is gazing, so that gaze regions of both the dominant eye and the non-dominant eye overlap. Hence, the dominant eye is compelled to accommodate its vision based on the gaze direction of the non-dominant eye, which constructively impacts the convergence of the gaze direction of the dominant eye with the gaze direction of the non-dominant eye. Beneficially, this facilitates in assisting foveal views of the dominant eye and the non-dominant eye to match with each other, as the gaze direction of the non-dominant eye is known.

Optionally, when (ii) is performed, the processor is configured to select the predefined dominant-eye optical power, from amongst a plurality of predefined dominant-eye optical powers, according to an optical depth at which the non-dominant eye is gazing. The plurality of predefined dominant-eye optical powers correspond to different optical depths at which the dominant eye may focus. When a given dominant-eye optical power corresponding to a given optical depth of focusing is employed for the dominant eye, the dominant eye perceives high visual detail of object(s) at the given optical depth. In this case, the predefined dominant-eye optical power is selected based on the optical depth at which the non-dominant eye is gazing, so that the region of the real-world environment (gazed at by the non-dominant eye) is sharply focused on the fovea of the dominant eye, in addition to being focused on the fovea of the non-dominant eye. Therefore, object(s) at the optical depth at which the non-dominant eye is gazing are sharply focused by the dominant eye also, for providing a high overall visual quality whilst also effectively treating amblyopia.

Moreover, optionally, the processor is configured to generate respective drive signals to drive the controlling means of the dominant-eye optical element and the controlling means of the non-dominant-eye optical element to produce the predefined dominant-eye optical power and the predefined non-dominant-eye optical power, respectively, when it is detected that the given criteria is not satisfied. In this regard, when the given criteria is not satisfied, the amblyopia treatment mode is not required to be activated. Hence, the predefined dominant-eye optical power and the predefined non-dominant-eye optical power are produced for the user to have perfect or near-perfect vision.

Optionally, the processor is configured to detect when the given criteria is satisfied on a periodic basis. In this regard, the given criteria is checked regularly to detect when the user is suffering from amblyopia. Optionally, the processor is configured to detect whether the given criteria is satisfied at regular intervals of time. For example, the given criteria can be checked every 5 minutes, every 10 minutes, every 30 minutes, every hour, or similar. A technical effect of such periodic checking is to actively monitor whether a condition of the non-dominant eye has any of: deteriorated, remained the same, or improved. In other words, such periodic checking can be performed to determine whether the amblyopia condition of the user is within or outside an acceptable level. In a case when the amblyopia condition is outside the acceptable level, more frequent amblyopia treatment may be required, and the periodic checking may be performed more frequently.

Furthermore, optionally, the processor is configured to:
detect, after the amblyopia treatment mode is activated, when the given criteria is not satisfied; and
when it is detected, after the amblyopia treatment mode is activated, that the given criteria is not satisfied, deactivate the amblyopia treatment mode, and generate respective drive signals to drive the controlling means of the dominant-eye optical element and the controlling means of the non-dominant-eye optical element to produce the predefined dominant-eye optical power and the predefined non-dominant-eye optical power, respectively.

Optionally, in this regard, the processor is configured to detect when the given criteria is no longer satisfied, after a given time period has elapsed from the activation of the amblyopia treatment mode. When the given criteria is no longer satisfied, the non-dominant eye no longer requires the amblyopia treatment. This could happen when the condition of the non-dominant eye has improved (even temporarily) due to provision of the amblyopia treatment in the activated amblyopia treatment mode of the optical apparatus. Upon such improvement, the gaze direction of the dominant eye and the gaze direction of the non-dominant eye converge within the predefined error margin. Notably, the respective drive signals generated for deactivating the amblyopia treatment mode are different from the respective drive signals that were earlier generated for activating the amblyopia treatment mode. The predefined dominant-eye optical power and the predefined non-dominant-eye optical power are produced upon deactivating the amblyopia treatment mode, for enabling vision correction corresponding to the existing underlying eye condition of the user besides amblyopia. When the existing underlying eye condition of the user is that the user's eyes have perfect vision, said optical powers may be zero optical powers. Otherwise, when existing underlying eye condition of the user is that the user's eyes have imperfect vision, said optical powers may be positive optical power and/or negative optical power, depending on whether the user has presbyopia and/or myopia and the optical depth at which the user is looking.

Moreover, optionally, the optical apparatus further comprises:
- a frame employed to hold the dominant-eye optical element and the non-dominant-eye optical element; and
- at least one input means, mounted on a temple of the frame, that is to be used by a user for at least one of:
  - activating or deactivating the amblyopia treatment mode of the optical apparatus;
  - allowing or disallowing an activation of the amblyopia treatment mode of the optical apparatus.

In this regard, the frame is designed in a manner that each of the dominant-eye optical element and the non-dominant-eye optical element is firmly arranged on the frame, along optical paths of light reaching their corresponding eyes. In an example, when the optical apparatus is implemented as a pair of eyeglasses, the frame may hold two optical elements, wherein one of the two optical elements that is arranged in front of the dominant eye of the user is the dominant-eye optical element, and another of the two optical elements is the non-dominant-eye optical element. It will be appreciated that a material of the frame could be plastic, metal, polymer, and the like. Moreover, the frame may be lightweight, ergonomically designed, and easy to use.

Optionally, the at least one input means is implemented as one of: a physical slider, a button. The at least one input means allows the user to conveniently control activation or deactivation of the amblyopia treatment mode of the optical apparatus, as per the user's preference. In one instance, when the user activates the amblyopia treatment mode of the optical apparatus using the at least one input means, the processor is configured to generate the respective drive signals to drive the controlling means of the dominant-eye optical element and the controlling means of the non-dominant-eye optical element as described earlier, without a need to detect whether the given criteria is satisfied or not. In another instance, when the user deactivates the amblyopia treatment mode of the optical apparatus, the processor generates the respective drive signals to drive the controlling means of the dominant-eye optical element and the controlling means of the non-dominant-eye optical element as described earlier, to produce the predefined dominant-eye optical power and the predefined non-dominant-eye optical power, respectively. This flexibility of activation/deactivation of the amblyopia treatment mode may, for example, be beneficial in a scenario where the user may require the amblyopia treatment mode of the optical apparatus only for a certain duration of time during a typical day when she/he wants to improve vision in the non-dominant eye of the user.

Furthermore, optionally, the at least one input means enables the user to conveniently allow or disallow the activation of the amblyopia treatment mode of the optical apparatus. This may, for example, be beneficial in a scenario where the user may require that their eyes function as per their existing condition, without external intervention in the form of the amblyopia treatment mode. Such a requirement may arise for safety reasons, for example, when the user is engaging in some critical vision-related task, undergoing some medical treatment, or similar. For example, the user may disallow the activation of the amblyopia treatment mode when she/he is driving a vehicle. In such a case, the amblyopia treatment mode would not be activated at all.

Moreover, optionally, the optical apparatus further comprises a wireless communication interface that is to be employed to communicably couple the processor of the optical apparatus to a computing device, wherein the computing device is to be used by a user for at least one of:
- activating or deactivating the amblyopia treatment mode of the optical apparatus,
- allowing or disallowing an activation of the amblyopia treatment mode of the optical apparatus,
- inputting the predefined dominant-eye optical power and the predefined non-dominant-eye optical power.

Examples of the wireless communication interface may include, but are not limited to, Wireless Fidelity (Wi-Fi), Internet, Near Field communication (NFC), ZigBee, Cellular, and Bluetooth®. Examples of the computing device include, but are not limited to, a cell phone, a laptop computer, a desktop computer, a tablet computer, a phablet, a personal digital assistant. Optionally, an interactive user interface is provided on the computing device, to enable the user to perform at least one of the aforesaid operations using the computing device. The user may input the predefined dominant-eye optical power and the predefined non-dominant-eye optical power, using the computing device, by one or more of: a touch input, an audio input, a gesture input. It will also be appreciated that prior to inputting the predefined dominant-eye optical power and the predefined non-dominant-eye optical power to be produced, the dominant-eye optical element and the non-dominant-eye optical element could be in a pre-set mode, which means that the predefined dominant-eye optical power and the predefined non-dominant-eye optical power could be pre-set to some default values. Using the computing device, such optical powers could be easily adjusted by the user.

The present disclosure also relates to the method as described above. Various embodiments and variants disclosed above, with respect to the aforementioned system, apply mutatis mutandis to the method.

Optionally, when (ii) is performed, the method comprises selecting the predefined dominant-eye optical power, from amongst a plurality of predefined dominant-eye optical powers, according to an optical depth at which the non-dominant eye is gazing.

Optionally, the method further comprises generating respective drive signals to drive the controlling means of the dominant-eye optical element and the controlling means of the non-dominant-eye optical element for producing the predefined dominant-eye optical power and the predefined non-dominant-eye optical power, respectively, when it is detected that the given criteria is not satisfied.

Optionally, the method further comprises detecting when the given criteria is satisfied on a periodic basis.

Optionally, the method further comprises:
- detecting, after the amblyopia treatment mode is activated, when the given criteria is not satisfied; and
- when it is detected, after the amblyopia treatment mode is activated, that the given criteria is not satisfied, deactivating the amblyopia treatment mode, and generating respective drive signals to drive the controlling means of the dominant-eye optical element and the controlling means of the non-dominant-eye optical element for producing the predefined dominant-eye optical power and the predefined non-dominant-eye optical power, respectively.

Optionally, the optical apparatus further comprises:
- a frame employed to hold the dominant-eye optical element and the non-dominant-eye optical element; and
- at least one input means, mounted on a temple of the frame, wherein the method further comprises enabling the user to use the at least one input means for at least one of:

activating or deactivating the amblyopia treatment mode of the optical apparatus,
allowing or disallowing an activation of the amblyopia treatment mode of the optical apparatus.

Optionally, the optical apparatus further comprises a wireless communication interface that is to be employed to communicably couple the processor of the optical apparatus to a computing device, wherein the method further comprises enabling the user to use the computing device for at least one of:
activating or deactivating the amblyopia treatment mode of the optical apparatus,
allowing or disallowing an activation of the amblyopia treatment mode of the optical apparatus,
inputting the predefined dominant-eye optical power and the predefined non-dominant-eye optical power, wherein the optical apparatus comprises the processor.

Optionally, the method further comprises:
determining an optical depth at which the user is looking, based on a convergence of the gaze direction of the dominant eye and the gaze direction of the non-dominant eye; and
selecting a predefined optical power for a given eye, from amongst a plurality of predefined optical powers for the given eye, based on the optical depth at which the user is looking.

Optionally, the controlling means comprises:
at least one first electrode deposited on the first substrate and disposed between the first substrate and the active material; and
at least one second electrode deposited on the second substrate and disposed between the second substrate and the active material, wherein the at least one first electrode and the at least one second electrode are optically transparent, wherein the active material is a liquid crystal material, wherein when controlling the active material, an alignment of liquid crystal molecules of the liquid crystal material is controlled for adjusting a refractive index of the liquid crystal material in the active optical element, thereby producing a given optical power.

DETAILED DESCRIPTION OF THE DRAWINGS

Figure 1:
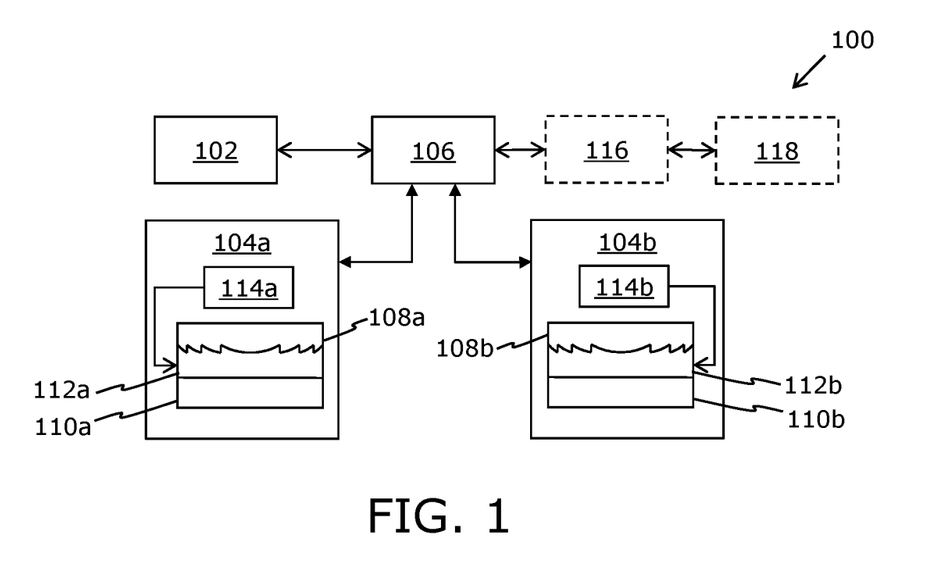
FIG. 1 is an illustration of a block diagram of an architecture of an optical apparatus, in accordance with different embodiments of the present disclosure.

Referring to FIG. 1, illustrated is a block diagram of an architecture of an optical apparatus 100, in accordance with an embodiment of the present disclosure. The optical apparatus 100 comprises eye-tracking means 102, a dominant eye-optical element 104a, a non-dominant eye optical element 104b, and a processor 106. Herein, each of the dominant-eye optical element 104a and the non-dominant-eye optical element 104b comprises a first substrate (depicted as a first substrate 108a for the dominant-eye optical element 104a and a first substrate 108b for the non-dominant-eye optical element 104b), a second substrate (depicted as a second substrate 110a for the dominant-eye optical element 104a and a second substrate 110b for the non-dominant-eye optical element 104b), an active material (depicted as an active material 112a for the dominant-eye optical element 104a and an active material 112b for the non-dominant-eye optical element 104b), and a controlling means (depicted as a controlling means 114a for the dominant-eye optical element 104a and a controlling means 114b for the non-dominant-eye optical element 104b) for controlling the active material 112a of the dominant-eye optical element 104a and for controlling the active material 112b of the non-dominant-eye optical element 104b, respectively.

Herein, the active material 112a is encased between the first substrate 108a and the second substrate 110a of the dominant-eye optical element 104a. Similarly, the active material 112b is encased between the first substrate 108b and the second substrate 110b of the non-dominant-eye optical element 104b. The processor 106 is communicably coupled to the eye-tracking means 102 and the controlling means 114a-b.

Optionally, the optical apparatus 100 further comprises a wireless communication interface 116 that is to be employed to communicably couple the processor 106 of the optical apparatus 100 to a computing device 118. The computing device 118 is to be used by a user.

FIG. 1 is merely an example, which should not unduly limit the scope of the claims therein. It is to be understood that the specific implementations of the optical apparatus 100 are provided as examples and are not to be construed as limiting it to specific types, numbers, or shapes of substrates, active material, or controlling means. A person skilled in the art will recognise many variations, alternatives, and modifications of embodiments of the present disclosure. It will be appreciated that the first substrates 108a-b have been shown as Fresnel substrates, for the sake of providing an example only; the first substrates 108a-b and the second substrates 110a-b can have any suitable shape depending on the purpose for which the optical apparatus 100 is to be used (namely, for presbyopia, myopia, hypermetropia, or any combination thereof).

Figure 2:
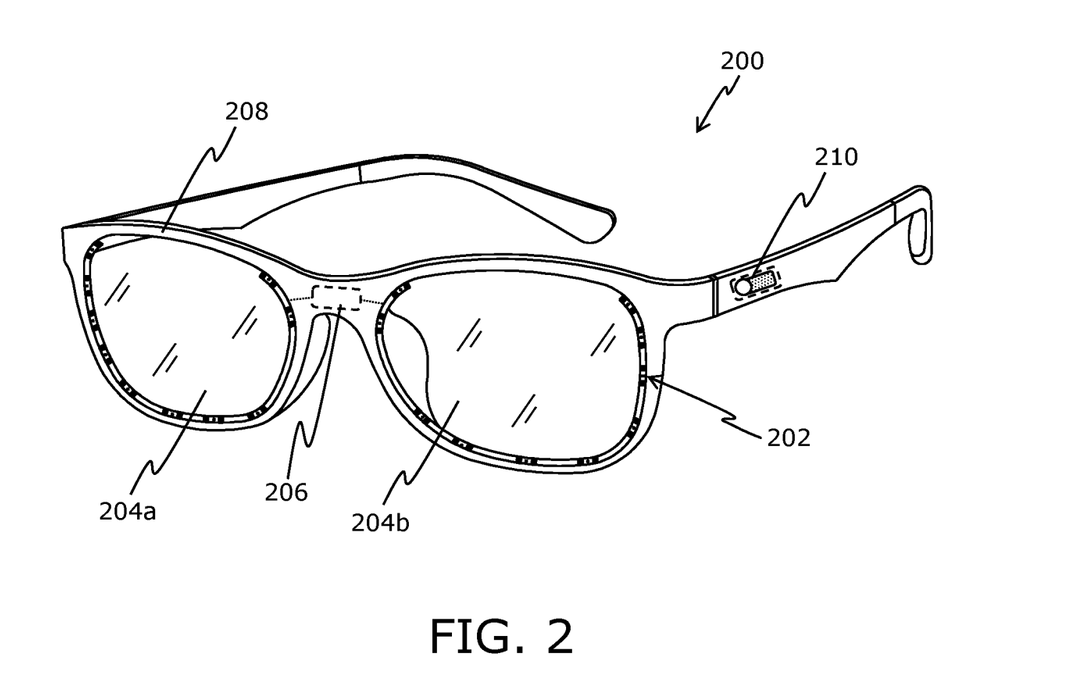
FIG. 2 is an illustration of a schematic diagram of an optical apparatus, in accordance with an embodiment of the present disclosure.

Referring to FIG. 2, illustrated is a schematic diagram of an optical apparatus 200, in accordance with an embodiment of the present disclosure. As shown, for example, the optical apparatus 200 is implemented as a pair of eyeglasses. The optical apparatus 200 comprises eye-tracking means 202, a dominant-eye optical element 204a (depicted for example as an eyeglass lens), a non-dominant-eye optical element 204b (depicted for example as another eyeglass lens), a processor 206, a frame 208 for holding the dominant-eye optical element 204a and the non-dominant-eye optical element 204b, and at least one input means (depicted as an input means 210) mounted on a temple of the frame 208. The input means 210 is implemented, for example, as a physical slider.

FIG. 2 is merely an example, which should not unduly limit the scope of claims therein. It is to be understood that the specific implementation of the optical apparatus 200 is provided as an example and is not to be construed as limiting it to specific numbers or types of optical elements, components of the eye-tracking means, and input means. A person skilled in the art will recognize many variations, alternatives, and modifications of embodiments of the present disclosure.

Figure 3A:
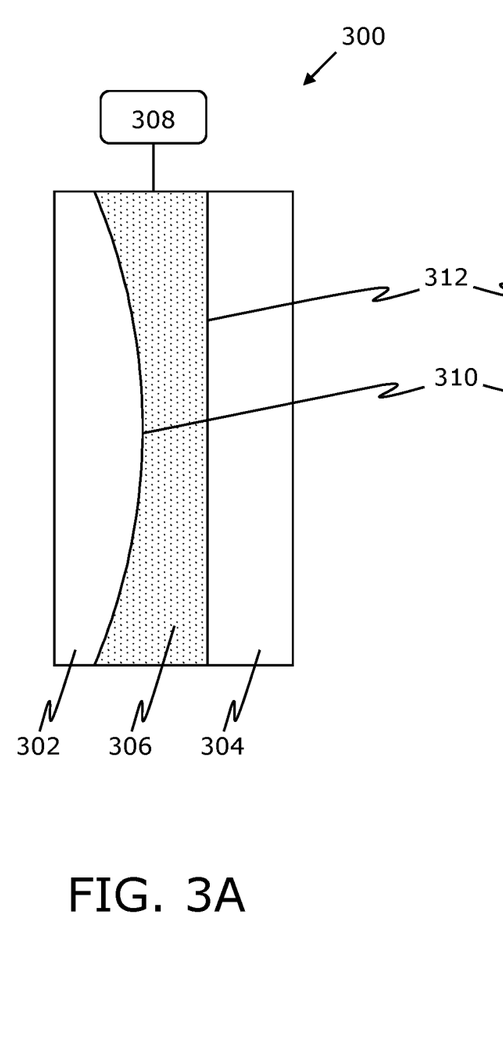
FIGS. 3A and 3B are illustrations of cross-sectional views of an exemplary optical element, in accordance with different embodiments of the present disclosure.
Figure 3B:
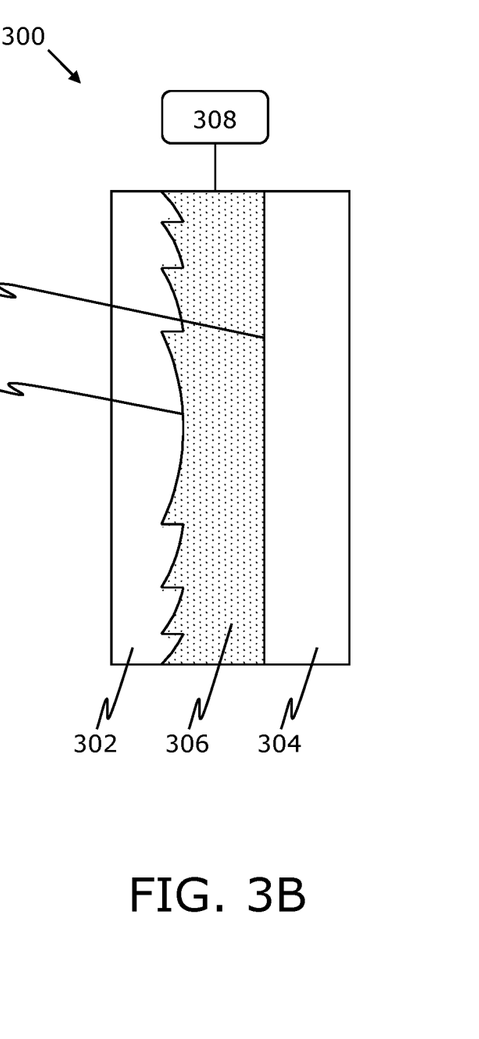

Referring to FIGS. 3A and 3B, illustrated are cross-sectional views of an exemplary optical element 300, in accordance with different embodiments of the present disclosure. Herein, the exemplary optical element 300 is any of: a dominant-eye optical element, a non-dominant-eye optical element. In both FIG. 3A and FIG. 3B, the exemplary optical element 300 comprises a first substrate 302, a second substrate 304, an active material 306, and a controlling means 308. The controlling means 308 comprises at least one first electrode (depicted as a first electrode 310) and at least one second electrode (depicted as a second electrode 312). The active material 306 is encased between the first substrate 302 and the second substrate 304. The first electrode 310 is deposited on the first substrate 302, and is disposed between the first substrate 302 and the active material 306. Likewise, the second electrode 312 is deposited on the second substrate 304, and is disposed between the second substrate 304 and the active material 306.

As shown in FIG. 3A, the first substrate 302 could be implemented as a planoconvex lens whose convex surface faces the active material 306, and whose curvature corresponds to a given optical power that is to be produced (for example, such as a positive optical power that is prescribed to a user having presbyopia). Alternatively, as shown in FIG. 3B, the first substrate 302 could be implemented as a Fresnel lens having concentric grooves, wherein the concentric grooves face the active material 306. In such a case, the concentric grooves of the Fresnel lens are formed to emulate characteristics of the aforesaid planoconvex lens.

In an implementation, the active material 306 is a liquid crystal material. When controlling the active material 306 via the first electrode 310 and the second electrode 312, an alignment of liquid crystal molecules of the liquid crystal material is controlled to adjust a refractive index of the liquid crystal material in the active optical element, thereby producing the given optical power.

FIGS. 3A and 3B are merely examples, which should not unduly limit the scope of the claims herein. It is to be understood that the specific implementations of the given optical element 300 are provided as examples and are not to be construed as limiting it to specific arrangements of the first substrate 302, the second substrate 304, the controlling means 308, the first electrode 310, and the second electrode 312, or to specific curvatures of the first substrate 302 and/or the second substrate 304. A person skilled in the art will recognize many variations, alternatives, and modifications of embodiments of the present disclosure.

Figure 4:
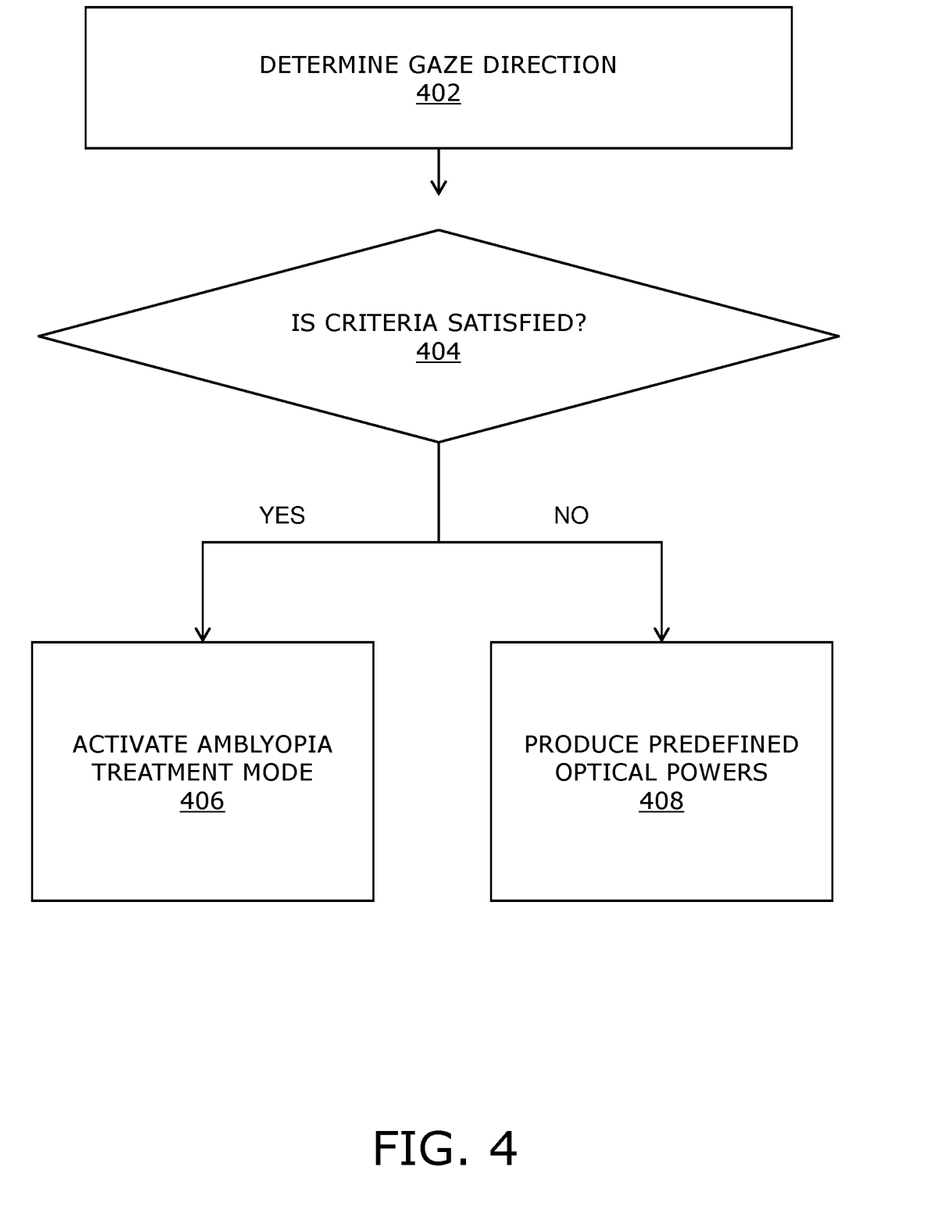
FIG. 4 is an illustration of steps of a method for incorporating actively adaptive optical elements for amblyopia treatment, in accordance with an embodiment of the present disclosure.

FIG. 4 illustrate steps of a method for incorporating actively adaptive optical elements for amblyopia treatment, in accordance with an embodiment of the present disclosure. At step 402, the eye-tracking data is processed to determine a gaze direction of the dominant eye and a gaze direction of the non-dominant eye. At step 404, it is detected whether the given criteria is satisfied. Herein, the given criteria is satisfied, when at least one of the following is true: the gaze direction of the dominant eye and the gaze direction of the non-dominant eye has not converged for at least a predefined time period, the gaze direction of the dominant eye and the gaze direction of the non-dominant eye has not converged within a predefined error margin from each other. When the given criteria is satisfied, at step 406, an amblyopia treatment mode of the optical apparatus is activated, and respective drive signals are generated to drive the controlling means of the dominant-eye optical element and the controlling means of the non-dominant-eye optical element to perform any of:

(i) produce, at the dominant-eye optical element, an optical power that is different from a predefined dominant-eye optical power corresponding to the dominant eye, whilst producing, at the non-dominant-eye optical element, a predefined non-dominant-eye optical power corresponding to the non-dominant eye, (ii) produce the predefined dominant-eye optical power and the predefined non-dominant eye optical power at the dominant-eye optical element and the non-dominant-eye optical element, respectively, whilst applying a prism correction on the dominant-eye optical element to optically shift light, incident thereupon and emanating from a region of a real-world environment at which the non-dominant eye is gazing, to be incident on a fovea of the dominant eye.

Optionally, when the given criteria is not satisfied, at step 408, respective drive signals are generated to drive the controlling means of the dominant-eye optical element and the controlling means of the non-dominant-eye optical element to produce the predefined dominant-eye optical power and the predefined non-dominant-eye optical power, respectively.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An optical apparatus comprising:
eye-tracking means;
a dominant-eye optical element and a non-dominant-eye optical element for a dominant eye and a non-dominant eye of a user, respectively, wherein each of the dominant-eye optical element and the non-dominant-eye optical element comprises:
at least a first substrate and a second substrate that are optically transparent;
an active material encased between the first substrate and the second substrate; and
controlling means for controlling the active material to generate one or more optical powers; and
a processor configured to:
process eye-tracking data, collected by the eye-tracking means, to determine a gaze direction of the dominant eye and a gaze direction of the non-dominant eye;
detect when a given criteria is satisfied, wherein the given criteria is satisfied when at least one of the following is true:
the gaze direction of the dominant eye and the gaze direction of the non-dominant eye has not converged for at least a predefined time period,
the gaze direction of the dominant eye and the gaze direction of the non-dominant eye has not converged within a predefined error margin from each other; and
when it is detected that the given criteria is satisfied, activate an amblyopia treatment mode of the optical apparatus, and generate respective drive signals to drive the controlling means of the dominant-eye optical element and the controlling means of the non-dominant-eye optical element to perform any of:
(i) produce, at the dominant-eye optical element, an optical power that is different from a predefined dominant-eye optical power corresponding to the dominant eye, whilst producing, at the non-dominant-eye optical element, a predefined non-dominant-eye optical power corresponding to the non-dominant eye,
(ii) produce the predefined dominant-eye optical power and the predefined non-dominant eye optical power at the dominant-eye optical element and the non-dominant-eye optical element, respectively, whilst applying a prism correction on the dominant-eye optical element to optically shift light, incident thereupon and emanating from a region of a real-world environment at which the non-dominant eye is gazing, to be incident on a fovea of the dominant eye.

2. The optical apparatus of claim 1, wherein when (ii) is performed, the processor is configured to select the predefined dominant-eye optical power, from amongst a plurality of predefined dominant-eye optical powers, according to an optical depth at which the non-dominant eye is gazing.

3. The optical apparatus of claim 1, wherein the processor is configured to generate respective drive signals to drive the controlling means of the dominant-eye optical element and the controlling means of the non-dominant-eye optical element to produce the predefined dominant-eye optical power and the predefined non-dominant-eye optical power, respectively, when it is detected that the given criteria is not satisfied.

4. The optical apparatus of claim 1, wherein the processor is configured to detect when the given criteria is satisfied on a periodic basis.

5. The optical apparatus of claim 1, wherein the processor is configured to:
detect, after the amblyopia treatment mode is activated, when the given criteria is not satisfied; and
when it is detected, after the amblyopia treatment mode is activated, that the given criteria is not satisfied, deactivate the amblyopia treatment mode, and generate respective drive signals to drive the controlling means of the dominant-eye optical element and the controlling means of the non-dominant-eye optical element to produce the predefined dominant-eye optical power and the predefined non-dominant-eye optical power, respectively.

6. The optical apparatus of claim 1, further comprising:
a frame employed to hold the dominant-eye optical element and the non-dominant-eye optical element; and
at least one input means, mounted on a temple of the frame, that is to be used by a user for at least one of:
activating or deactivating the amblyopia treatment mode of the optical apparatus,
allowing or disallowing an activation of the amblyopia treatment mode of the optical apparatus.

7. The optical apparatus of claim 1, further comprising a wireless communication interface that is to be employed to communicably couple the processor of the optical apparatus to a computing device, wherein the computing device is to be used by a user for at least one of:
activating or deactivating the amblyopia treatment mode of the optical apparatus,
allowing or disallowing an activation of the amblyopia treatment mode of the optical apparatus,
inputting the predefined dominant-eye optical power and the predefined non-dominant-eye optical power.

8. The optical apparatus of any claim 1, wherein the processor is configured to:
determine an optical depth at which the user is looking, based on a convergence of the gaze direction of the dominant eye and the gaze direction of the non-dominant eye; and
select a predefined optical power for a given eye, from amongst a plurality of predefined optical powers for the given eye, based on the optical depth at which the user is looking.

9. The optical apparatus of claim 1, wherein the controlling means comprises:

at least one first electrode deposited on the first substrate and disposed between the first substrate and the active material; and
at least one second electrode deposited on the second substrate and disposed between the second substrate and the active material,
wherein the at least one first electrode and the at least one second electrode are optically transparent, wherein the active material is a liquid crystal material, wherein when controlling the active material, an alignment of liquid crystal molecules of the liquid crystal material is controlled to adjust a refractive index of the liquid crystal material in the active optical element, thereby producing a given optical power.

10. A method implemented by an optical apparatus comprising eye-tracking means, a processor, and a dominant-eye optical element and a non-dominant-eye optical element for a dominant eye and a non-dominant eye of a user, respectively, wherein each of the dominant-eye optical element and the non-dominant-eye optical element comprises at least a first substrate and a second substrate that are optically transparent, an active material encased between the first substrate and the second substrate, and controlling means for controlling the active material to generate one or more optical powers, wherein the method comprises:
processing eye-tracking data, collected by the eye-tracking means, for determining a gaze direction of the dominant eye and a gaze direction of the non-dominant eye of the user;
detecting when a given criteria is satisfied, wherein the given criteria is satisfied when at least one of the following is true:
the gaze direction of the dominant eye and the gaze direction of the non-dominant eye has not converged for at least a predefined time period,
the gaze direction of the dominant eye and the gaze direction of the non-dominant eye has not converged within a predefined error margin from each other; and
when it is detected that the given criteria is satisfied, activating an amblyopia treatment mode of the optical apparatus, and generating respective drive signals to drive the controlling means of the dominant-eye optical element and the controlling means of the non-dominant-eye optical element for performing any of:
(i) producing, at the dominant-eye optical element, an optical power that is different from a predefined dominant-eye optical power corresponding to the dominant eye, whilst producing, at the non-dominant-eye optical element, a predefined non-dominant-eye optical power corresponding to the non-dominant eye,
(ii) producing the predefined dominant-eye optical power and the predefined non-dominant eye optical power at the dominant-eye optical element and the non-dominant-eye optical element, respectively, whilst applying a prism correction on the dominant-eye optical element to optically shift light, incident thereupon and emanating from a region of a real-world environment at which the non-dominant eye is gazing, to be incident on a fovea of the dominant eye.

11. The method of claim 10, wherein when (ii) is performed, the method comprises selecting the predefined dominant-eye optical power, from amongst a plurality of predefined dominant-eye optical powers, according to an optical depth at which the non-dominant eye is gazing.

12. The method of claim 10, further comprising generating respective drive signals to drive the controlling means of the dominant-eye optical element and the controlling means of the non-dominant-eye optical element for producing the predefined dominant-eye optical power and the predefined non-dominant-eye optical power, respectively, when it is detected that the given criteria is not satisfied.

13. The method of claim 10, further comprising detecting when the given criteria is satisfied on a periodic basis.

14. The method of claim 10, further comprising:
  detecting, after the amblyopia treatment mode is activated, when the given criteria is not satisfied; and
  when it is detected, after the amblyopia treatment mode is activated, that the given criteria is not satisfied, deactivating the amblyopia treatment mode, and generating respective drive signals to drive the controlling means of the dominant-eye optical element and the controlling means of the non-dominant-eye optical element for producing the predefined dominant-eye optical power and the predefined non-dominant-eye optical power, respectively.

15. The method of claim 10, wherein the optical apparatus further comprises:
  a frame employed to hold the dominant-eye optical element and the non-dominant-eye optical element; and
  at least one input means mounted on a temple of the frame,
  wherein the method further comprises enabling the user to use the at least one input means for at least one of:
    activating or deactivating the amblyopia treatment mode of the optical apparatus,
    allowing or disallowing an activation of the amblyopia treatment mode of the optical apparatus.

16. The method of claim 10, wherein the optical apparatus further comprises a wireless communication interface that is to be employed to communicably couple the processor of the optical apparatus to a computing device, wherein the method further comprises enabling the user to use the computing device for at least one of:
  activating or deactivating the amblyopia treatment mode of the optical apparatus,
  allowing or disallowing an activation of the amblyopia treatment mode of the optical apparatus,
  inputting the predefined dominant-eye optical power and the predefined non-dominant-eye optical power.

17. The method of claim 10, further comprising:
  determining an optical depth at which the user is looking, based on a convergence of the gaze direction of the dominant eye and the gaze direction of the non-dominant eye; and
  selecting a predefined optical power for a given eye, from amongst a plurality of predefined optical powers for the given eye, based on the optical depth at which the user is looking.

18. The method of claim 10, wherein the controlling means comprises:
  at least one first electrode deposited on the first substrate and disposed between the first substrate and the active material; and
  at least one second electrode deposited on the second substrate and disposed between the second substrate and the active material,
  wherein the at least one first electrode and the at least one second electrode are optically transparent, wherein the active material is a liquid crystal material, wherein when controlling the active material, an alignment of liquid crystal molecules of the liquid crystal material is controlled for adjusting a refractive index of the liquid crystal material in the active optical element, thereby producing a given optical power.

* * * * *